United States Patent [19]

Kim

[11] Patent Number: 5,649,052
[45] Date of Patent: *Jul. 15, 1997

[54] ADAPTIVE DIGITAL AUDIO ENCODING SYSTEM

[75] Inventor: Jong-Il Kim, Incheon, Rep. of Korea

[73] Assignee: Daewoo Electronics Co Ltd., Seoul, Rep. of Korea

[ * ] Notice: The term of this patent shall not extend beyond the expiration date of Pat. No. 5,402,495.

[21] Appl. No.: 366,144

[22] Filed: Dec. 29, 1994

[30] Foreign Application Priority Data

Jan. 18, 1994 [KR] Rep. of Korea .......................... 94-758

[51] Int. Cl.[6] .............................. G10L 3/02; G10L 9/00
[52] U.S. Cl. .............................. 395/2.35; 395/2.37
[58] Field of Search .................... 395/2.35, 2.1, 395/2.37, 2.91; 381/2, 58, 56, 94, 36, 29–40

[56] References Cited

U.S. PATENT DOCUMENTS

| | | | |
|---|---|---|---|
| 4,706,290 | 11/1987 | Lim | 381/58 |
| 5,115,469 | 5/1992 | Taniguchi et al. | 381/36 |
| 5,402,495 | 3/1995 | Kim | 381/94 |

OTHER PUBLICATIONS

Johnston, "Sum–Difference Stereo Transform Coding", ICASSP '92: Acoustics, Speech & Signal Processing Conference, pp.II–569–II–572 ,92.

Johnston, Transform Coding of Audio Signals Using Perceptual Noise Criteria, IEEE Journal on Selected Areas in Communications, vol. 6, No. 2 Feb. 1988.

*Primary Examiner*—Allen R. MacDonald
*Assistant Examiner*—Patrick N. Edouard
*Attorney, Agent, or Firm*—Anderson Kill & Olick P.C.

[57] ABSTRACT

An encoding system employing a novel perceptual spectrum difference estimation device improves the coding efficiency and audio quality of a digitized audio signal. The system comprises M number of encoding means arranged in parallel for encoding the input digital audio signal of a current frame, respectively; M number of decoding means arranged in parallel for decoding each of the encoded digital audio signals; a first estimator for estimating a power density spectrum for a difference signal between the input digital audio signal and each of the decoded digital audio signals; a second estimator for estimating a power density spectrum for the input digital audio signal of the current frame and for determining a masking threshold therefor based on the power density spectrum for the input digital audio signal; a third estimator for estimating a set of perceptual spectrum distances based on the power density spectrum for each of the difference signals and the masking threshold; and a circuit for selecting an encoded digital audio signal having a smallest perceptual spectrum distance.

1 Claim, 2 Drawing Sheets

ADAPTIVE DIGITAL AUDIO ENCODING SYSTEM

FIELD OF THE INVENTION

The present invention relates to a digital audio encoding system; and, more particularly, to an improved digital audio encoding system capable of providing an encoded audio signal with a minimum distortion measured in accordance with the human auditory perception.

DESCRIPTION OF THE PRIOR ART

Transmission of digitized audio signals makes it possible to deliver high quality audio signals comparable to those of standard compact disc/or digital audio tape. When an audio signal is expressed in a digital form, a substantial amount of data need be transmitted especially in the case of high definition television system. Since, however, the available frequency bandwidth assigned to such audio signals is limited, in order to transmit the substantial amounts of digital data, e.g., 768 Kbits per second for 16 bit PCM(Pulse Code Modulation) audio signal with 48 KHz sampling frequency, through the limited audio bandwidth of, e.g., about 128 KHz, it is inevitable to compress the audio signal. At the receiving end of the digital transmission, the compressed audio signal is decoded.

The quality of the decoded audio signal is largely dictated by the compression technique employed for the encoding thereof. Sometimes, in order to selectively generate an audio signal with a least distortion, the digital audio encoding system is provided with a plurality of encoders employing different compression techniques, a corresponding number of decoders and an audio distortion measuring device. In such a case, the encoders are arranged in a parallel fashion in order to carry out the encoding of the input digital audio signal simultaneously; and each of the decoders is coupled to its corresponding encoder for the decoding of the encoded digital audio signal therefrom. In such an arrangement, the digital audio encoding system selectively generates one of the encoded digital audio signals which causes a least audio distortion.

Audio distortions are usually measured in terms of "Total Harmonic Distortion(THD)" and "Signal to Noise Ratios (SNR)", wherein said THD is a RMS(root-mean-square) sum of all the individual harmonic-distortion components and/or IMD's(Intermodulation Distortions) which consist of sum and difference products generated when two or more signals pass through an encoder; and said SNR represents the ratio between the amplitude of an input digital signal and the amplitude of an error signal.

Such THD or SNR measurement, however, is a physical value which has no direct bearing on the human auditory faculty or and, accordingly, the conventional digital audio encoding system having such audio distortion measuring device has a limited ability to provide an encoded digital audio signal which best reflects the human auditory perception.

SUMMARY OF THE INVENTION

It is, a primary object of the invention to provide a novel digital audio encoding system for adaptively encoding an input digital audio signal closely matching the human auditory perception.

In accordance with the present invention, there is provided a novel system for encoding an input digital audio signal having a plurality of frames, which comprises: M number of encoding means arranged in parallel for encoding the input digital audio signal in a current frame, respectively; M number of decoding means arranged in parallel for decoding each of the encoded digital audio signals, respectively; first estimation means for estimating a power density spectrum of a difference signal between the input digital audio signal and each of the decoded digital audio signals; second estimation means for estimating a power density spectrum of the input digital audio signal in the current frame and for determining a masking threshold thereof based on the power density spectrum of the input digital audio signal; third estimation means for estimating a set of perceptual spectrum distances based on the power density spectrum for each of the difference signals and the frequency masking threshold; and means for selecting an encoded digital audio signal having a smallest perceptual spectrum distance.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENTS

Figure 1:
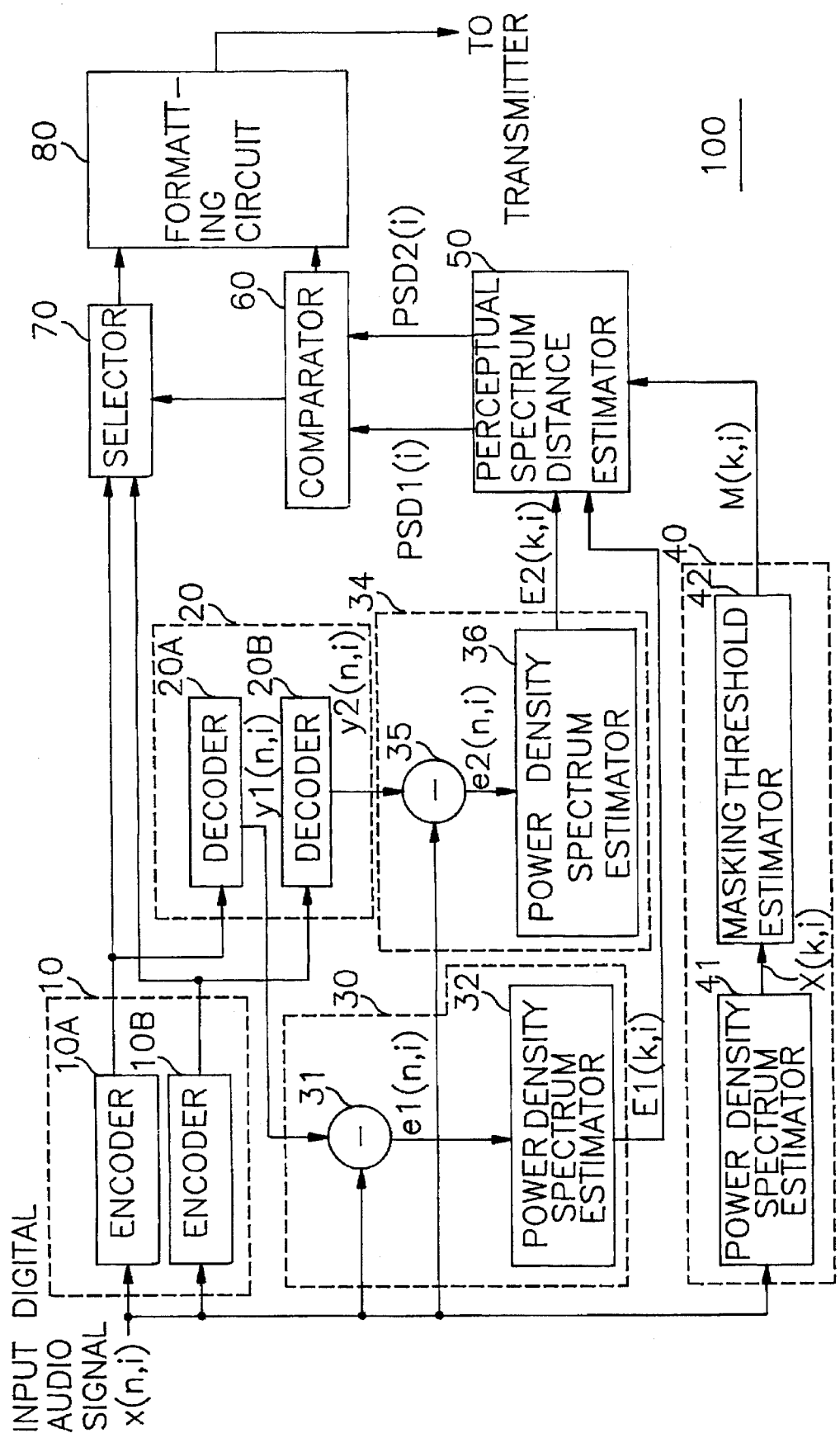
FIG. 1 is a block diagram illustrating a novel digital audio encoding system in accordance with the present invention.

Referring to FIG. 1, there is shown a block diagram illustrating a digital audio encoding system 100 in accordance with the present invention.

The encoding system 100 comprises an encoding device 10, a decoding device 20, a first and a second power density spectrum estimation units 30 and 34, a masking threshold estimation unit 40, a perceptual spectrum distance estimator 50, a comparator 60, a selector 70 and a formatting circuit 80.

An input digital audio signal x(n,i) of an ith frame, or a current frame, which includes N samples, i.e., n=0, 1, 2, .. ,N−1, is applied to the encoding device 10 which is adapted to perform an encoding operation of the input digital audio signal at a predetermined bit rate, wherein N is a positive integer and one frame includes L, e.g., 32, subbands. A "frame" used herein denotes a part of the digital audio signal which corresponds to a fixed number of audio samples and is a processing unit for the encoding and decoding of the digital audio signal.

As shown, the encoding device 10 includes a plurality of encoders, e.g., two encoders 10A and 10B, which are coupled in a parallel manner in order to simultaneously receive the input digital audio signal of the current frame and encode the input digital audio signal by using various compression techniques. For instance, the encoder 10A may carry out an encoding operation of the input digital audio signal of the ith frame by employing an intra-frame bit allocation technique which adaptively assigns bits to each subband included within one frame based on a perceptual entropy for each of the subbands therein, and the encoder 10B may perform an encoding operation of the input digital audio signal by using an inter-frame bit allocation technique which adaptively assigns bits to each frame included within a predetermined group of frames based on a perceptual entropy for each frame; and, alternatively, the encoders 10A and 10B may include non-uniform and uniform quantizers, respectively.

The perceptual entropy PE(i) for the ith frame, as is well known in the art, may be represented as:

$$PE(i) = \frac{1}{L} \sum_{m=0}^{L-1} \text{MAX}\left[ 0, \frac{1}{2} \log_2 \frac{P(m)}{M(m)} \right] \text{dB} \quad \text{Eq. (1)}$$

wherein m is a subband index with m=0,1,...,L−1, L being the total number of subbands in a frame; P(m), a sound pressure level in subband m estimated from a Fast Fourier Transform(FFT) technique; and M(m), a masking threshold in subband m.

The encoded digital audio signal from each of the encoders is applied to the selector 70 and the decoding device 20 which includes a plurality of decoders, e.g., 20A and 20B. Each of the decoders is adapted to decode a corresponding encoded digital audio signal from the encoders. The decoded digital audio signals y1(n,i) and y2(n,i) from the decoders 20A and 20B are applied to the first and second power density spectrum estimation units 30 and 34, respectively, wherein each of said power density spectrum estimation units includes a subtractor 31(35) and a power density spectrum estimator 32(36), respectively. The subtractor 31 included in the first power density spectrum estimation unit 30 generates a difference signal e1(n,i) representative of the difference between the input digital audio signal x(n,i) to the system and the decoded digital audio signal y1(n,i) from the decoder 20A, which may be represented as:

$$e1(n, i) = x(n,i) - y1(n,i) \quad \text{Eq. (2)}$$

wherein both x(n,i) and y1(n,i) are P(e.g., 16)-bit pulse code modulation(PCM) audio signals.

Subsequently, the difference signal is provided to the power density spectrum estimator 32 which serves to carry out the Fast Fourier Transform conversion thereof from the time domain to the frequency domain.

Figure 2:
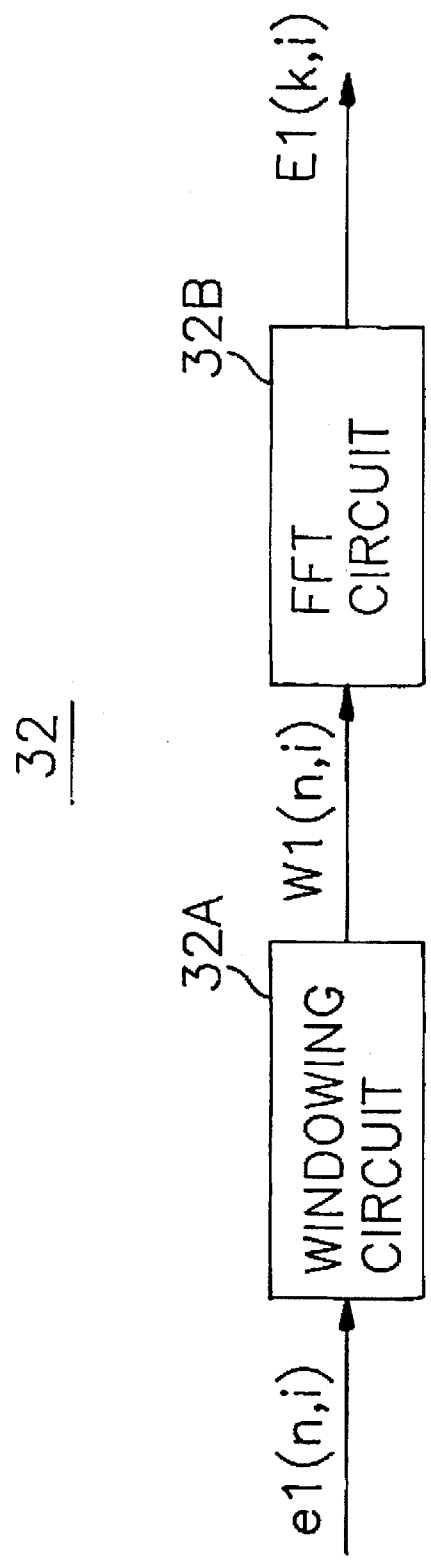
FIG. 2 is a detailed block diagram depicting the power density spectrum estimator shown in FIG. 1.

Turning now to FIG. 2, the power density spectrum estimator 32 includes a windowing circuit 32A and a Fast Fourior Transform(FFT) circuit 32B.

The windowing circuit 32A receives the difference signal e1(n,i) from the subtracter 31; and performs the windowing process by multiplying the difference signal e1(n,i) with a predetermined hanning window. The predetermined harming window h(n) may be represented as:

$$h(n) = 0.5 \sqrt{8/3} \ \{1 - \cos(2\pi n/N)\} \quad \text{Eq. (3)}$$

wherein N is a positive integer and n=0, 1, 2, ..., N−1.

Accordingly, the output w1(n,i) from the windowing circuit 32A may be represented as:

$$w1(n,i) = e1(n,i) \cdot h(n) \quad \text{Eq. (4)}$$

wherein i is a frame index and n has the same meaning as previously defined.

The output w1(n,i) from the windowing circuit 32A is then provided to the FFT circuit 32B which estimates the power density spectrum thereof; and, as a preferred embodiment of the present invention, includes a 512 point FFT for Psychoacoustic Model I[or MPEG(moving pictures expert group)-Audio Layer I]. Accordingly, the power density spectrum E1(k,i) for the difference signal e1(n,i) of the ith frame, as is well known in the art, may be calculated as follows:

$$E1(k, i) = 10 \log_{10} \left| \frac{1}{N} \sum_{n=0}^{N-1} w1(n, i) \cdot e^{-j2\pi kn/N} \right|^2 \text{dB} \quad \text{Eq. (5)}$$

wherein k=0, 1, ...,(N/2)−1, N and n have the same meanings as previously defined.

Referring back to FIG. 1, the second power density spectrum unit 34 is substantially identical to the first power density spectrum unit 30 excepting that the power density spectrum E2(k,i) for a difference signal e2(n,i) representative of the difference between the input digital audio signal x(n,i) and the decoded digital audio signal y2(n,i) from the decoder 20B is calculated therein. The difference signal e2(n,i) from the subtractor 35 may be represented as:

$$e2(n,i) = x(n,i) - y2(n,i) \quad \text{Eq. (6)}$$

wherein n and i have the same meanings as previously defined.

Therefore, it should be appreciated that the power density spectrum E2(k,i) for the difference signal e2(n,i) can be obtained by windowing the difference signal e2(n,i) with the hanning window h(n) as is done for the difference signal e1(n,i) in Eq.(4). Said power density spectrum E2(k,i) of the difference signal e2(n,i) for the ith frame may be obtained as:

$$E2(k, i) = 10 \log_{10} \left| \frac{1}{N} \sum_{n=0}^{N-1} w2(n, i) \cdot e^{-j2\pi kn/N} \right|^2 \text{dB} \quad \text{Eq. (7)}$$

wherein N, n, k, and i have the same meanings as previously defined, with w2(n,i)=e2(n,i)·h(n).

In the meanwhile, the masking threshold estimation unit 40 is adapted to receive the input digital audio signal x(n,i) of the ith frame and to estimate the masking threshold thereof. The masking threshold estimation unit 40 includes a power density spectrum estimator 41 and a masking threshold estimator 42. The power density spectrum estimator 41 is substantially identical to the power density spectrum estimator included in the first or second power density spectrum estimation unit excepting that the power density spectrum X(k,i) of the input digital audio signal x(n,i) for the ith frame is calculated therein. The power density spectrum X(k,i) of the input digital audio signal x(n,i) for the ith frame may be obtained as:

$$X(k, i) = 10 \log_{10} \left| \frac{1}{N} \sum_{n=0}^{N-1} w(n, i) \cdot e^{-j2\pi kn/N} \right|^2 \text{dB} \quad \text{Eq. (8)}$$

wherein N, n, k, and i have the same meanings as previously defined, with w(n,i)=x(n,i)·h(n).

The power density spectrum of the input digital audio signal, X(k,i), estimated at the power density spectrum estimator 41 is then provided to the masking threshold estimator 42 which serves to estimate a masking threshold depending on the power density spectrum of the input digital audio signal.

The masking threshold represents an audible limit closely reflecting the human auditory perception, which is a sum of the intrinsic audible limit or threshold of a sound and an increment caused by the presence of another(masking) contemporary sound in the frequency domain, as described in an article, which is incorporated herein by reference, entitled "Coding of Moving Pictures and Associated Audio", ISO/IEC/JTC1/SC29/WG11 NO501 MPEG 93(Jul., 1993), wherein the so-called Psychoacoustic Models I and II are discussed for the calculation of the masking threshold. In a preferred embodiment of the present invention, Psychoacoustic Model I is advantageously employed in the masking threshold estimator 42.

The power density spectrums $E1(k,i)$ and $E2(k,i)$ and the masking threshold $M(k,i)$ are simultaneously provided to the perceptual spectrum distance estimator 50 which is adapted to derive first and second perceptual spectrum distances PSD1(i) and PSD2(i) representative of the audio distortions for the power density spectrums $E1(k,i)$ and $E2(k,i)$ as perceived by the human auditory faculty with the masking effect taken into consideration. The first perceptual spectrum distance PSD1(i) for the power density spectrum $E1(k,i)$ from the power density spectrum estimator 32 may be represented as:

$$PSD1(i) = \frac{1}{N/2} \sum_{k=0}^{(N/2)-1} MAX[0, (E1(k, i) - M(k, i))] \quad \text{Eq. (9)}$$

wherein k and i are the same as previously defined.

Similarly, the second perceptual spectrum distance PSD2(i) for the power density spectrum $E2(k,i)$ from the power density spectrum estimator 36 may be defined as:

$$PSD2(i) = \frac{1}{N/2} \sum_{k=0}^{(N/2)-1} MAX[0, (E2(k, i) - M(k, i))] \quad \text{Eq. (10)}$$

wherein k and i are the same as previously defined.

As can be seen from Eqs.(9) and (10), the perceptual spectrum distance for the ith frame is estimated by the power density spectrum of the difference signal which exceeds the masking threshold. The first and second perceptual spectrum distances PSD1(i) and PSD2(i) are applied to the comparator 60 which serves to generate a selection signal identifying a least distorted digital audio signal among the two encoded digital audio signals from the encoders, e.g., 10A and 10B, by comparing their perceptual spectrum distances. The selection signal from the comparator 60 is then provided to the selector 70 and the formatting circuit 80.

In response to the selection signal from the comparator 60, the selector 70 selects the least distorted digital audio signal among the encoded digital audio signals from the encoders to thereby provide the selected audio signal to the formatting circuit 80.

At the formatting circuit 80, the selection signal from the comparator 60 and the selected audio signal from the selector 70 formatted and transmitted to a transmitter (not shown) for the transmission thereof.

While the present invention has been shown and described with reference to the particular embodiments, it will be apparent to those skilled in the art that many changes and modifications may be made without departing from the spirit and scope of the invention as defined in the appended claim.

What is claimed is:

1. A system for adaptively encoding an input digital audio signal having a plurality of frames, which comprises:

M number of encoding means arranged in parallel for encoding the input digital audio signal in a current frame, respectively;

M number of decoding means arranged in parallel for decoding each of the encoded digital audio signals;

first estimation means for estimating a power density spectrum of a difference signal between the input digital audio signal and each of the decoded digital audio signals;

second estimation means for estimating a power density spectrum of the input digital audio signal in the current frame and for determining a masking threshold thereof based on the power density spectrum of the input digital audio signal;

third estimation means for deriving a set of perceptual spectrum distances based on the power density spectrum of each of the difference signals and the masking threshold; and means for selecting an encoded digital audio signal having a smallest perceptual spectrum distance.

* * * * *